W. EVANS,

J. EVANS, Assignee.

Manufacture of Ear-Blanks for Elliptic-Springs.

No. 8,612. Reissued Mar. 11, 1879.

Witnesses:

P. C. Dieterich.

Frank H. Duffy

John Evans.

assignee of the entire interest.

Per Walter J. Budd Attorney.

N. PETERS, PHOTO-LITHOGRAPHER, WASHINGTON, D. C.

UNITED STATES PATENT OFFICE.

JOHN EVANS, OF PHILADELPHIA, PA., ASSIGNEE OF WILLIAM EVANS.

IMPROVEMENT IN THE MANUFACTURE OF EAR-BLANKS FOR ELLIPTIC SPRINGS.

Specification forming part of Letters Patent No. 88,861, dated April 13, 1869; Reissue No. 8,612, dated March 11, 1879; application filed October 23, 1878.

*To all whom it may concern:*

Be it known that WILLIAM EVANS, formerly of the city of Pittsburg, in the county of Allegheny and State of Pennsylvania, and now of the city of Philadelphia and State aforesaid, invented certain new and useful Improvements in Ear-Blanks for Elliptic Springs, for which Letters Patent of the United States dated April 13, 1869, and numbered 88,861, were duly granted and issued to me, JOHN EVANS, as the sole assignee of his entire interest in and to the said invention and Letters Patent of the United States therefor, which said Letters Patent being defective in their specifications and inoperative I have surrendered; and I do now hereby declare the following to be a sufficiently full and clear and exact description of the said invention, and the mode of making and using the same, reference being had to the accompanying drawings and letters of reference marked thereon.

Figure 1:
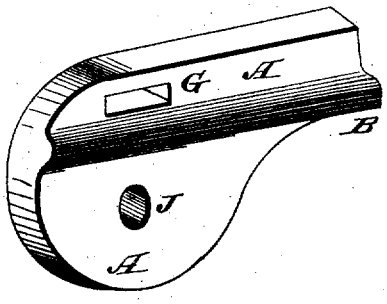
Figure 2:
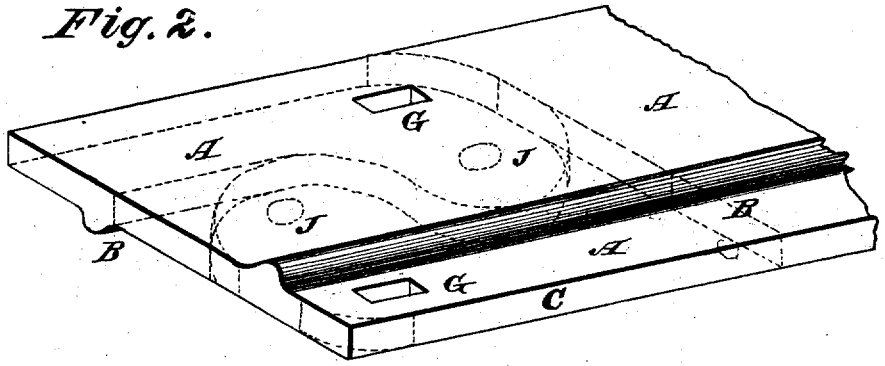
Figure 3:
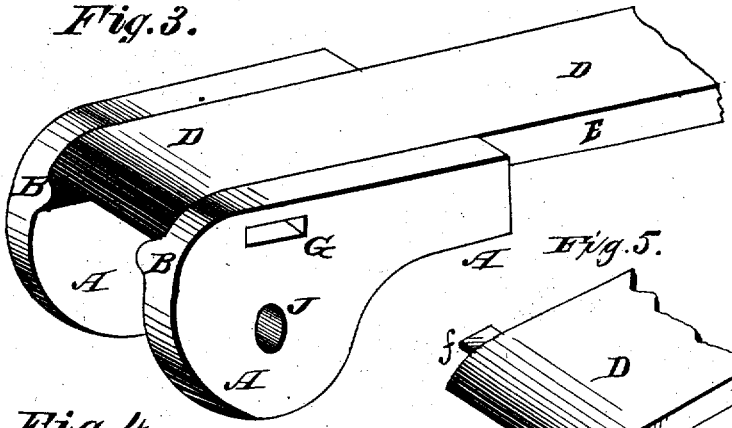
Figure 5:
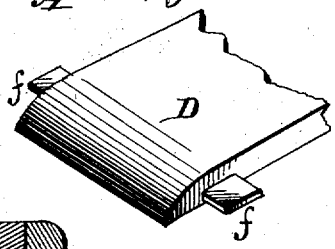
Figure 4:
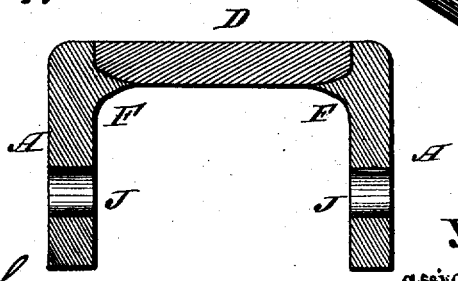

Figure 1 shows an ear-blank made in accordance with this invention, in perspective. Fig. 2 is a perspective view, illustrating a convenient and economical mode of making the ear-blanks. Fig. 3 is a perspective view, showing the mode of applying the ears to the spring plate or bar preparatory to welding them thereto. Fig. 4 is a section of a spring through the ears after welding. Fig. 5 is a broken view of the spring-bar and stud-pins thereon.

The same letters of reference apply to the same parts in the several figures.

The purpose of this invention is to present the metal forming the ear-blank in such form that, by the welding process, it shall become firmly and effectually united with the spring plate or bar without increasing the labor of welding, and thus to furnish cheaply a superior quality of spring.

Prior to this invention ear-blanks had been made having a portion of the metal at their side or end margin bent over so as to come in contact with the flat side of the spring plate or bar, while the flat side of such ear-blanks came in contact with the edge of the spring plate or bar. Such ear-blanks required in welding a lateral pressure or hammering to insure union with the spring-bar, and could not be quickly welded by simple tools, and produced an inferior quality of work, owing to the uncertainty of soundness in welding. Such difficulty and uncertainty of sound welding is remedied or avoided by this invention.

This improved ear-blank A is formed with a raised or projecting bead, B, at a sufficient distance from the margin or edge C of the blank to leave metal sufficient between the bead B and edge C to cover and unite in the welding operation with the edge E of the spring-bar D.

The ear-blanks are made in pairs, or right and left, the difference between the right and left being in the side upon which the bead or projecting rib is formed.

The beads B on a pair of ears in the welding operation unite with the under surface of the spring-bar D, spreading a portion of the material thereon and forming strong fillets F F in the angles formed by the inner surfaces of the ears A and the spring-bar D.

The position in which the metal of the beads is presented when properly heated and placed in a suitably-shaped die with the spring-bar D, also heated, resting upon the beads, is such that the direct stroke of the die or hammer effects a perfectly sound welding of the ears to the spring-bar at a single operation and a perfectly-formed end to the spring.

The ear-blanks are most conveniently formed by punching them from a bar or plate of metal formed with one or more continuous beads or projecting ribs, B, upon it. Such a bar is shown in Fig. 2, in which one rib is upon each side of the bar, and the positions from which the several ears are cut are indicated by the dotted lines, showing that but little material is wasted in the punching process, and also indicating how both right and left ears may be produced by the same punch and die.

Perforations marked G may be made in the ears, which fit upon projections or stud-pins *f*, formed in the sides of the spring-bar, so as to hold the ears and plate or bar in position during the heating operation and while placing them in the die for welding them together.

Holes (marked J) for the bolts or rivets may be made in the ear-blanks.

Such ear-blanks as are hereinbefore described are produced cheaply, and form a useful and saleable article of manufacture and merchandise in the trade.

It will be observed that the main point of difference between the improved ear-blank herein described and those heretofore employed lies in the fact that a rib of metal is provided extending along the entire inner side of the plate or spring when applied thereto, instead of simply forming a clip at one end of the ear, as has heretofore been the practice, thus greatly strengthening the weld, and placing the metal where the greatest strain is felt.

Having described the above invention, and the mode of making and using the same, what I claim therein as new and useful is—

1. Ear-blanks for elliptic springs having a projecting rib or bead formed upon one of their faces, substantially as and for the purpose described and set forth.

2. The method of manufacturing right and left hand ear-blanks herein described, consisting in first forming a bar with longitudinal ribs on the faces and near the opposite edges thereof, and subsequently by the use of a single die or punch cutting the ear-blanks from the blanks, substantially as and for the purpose set forth.

3. The improved ear-blank A, provided with a longitudinal rib on its face, and the perforation G, combined with and applied to the plate or spring having the stud-pin *f*, substantially as and for the purpose set forth.

JOHN EVANS,
*Assignee.*

Witnesses:
J. DANIEL EBY,
E. M. HUGENTOBLER.